(12) United States Patent
Hong et al.

(10) Patent No.: US 6,583,842 B2
(45) Date of Patent: Jun. 24, 2003

(54) LIQUID CRYSTAL DISPLAY DEVICE OF REFLECTIVE TYPE FRINGE FIELD SWITCHING MODE

(75) Inventors: Seung Ho Hong, Kyoungki-do (KR); Youn Hak Jeong, Kyoungki-do (KR); Jin Mahn Kim, Kyoungki-do (KR); Seung Hee Lee, Kyoungki-do (KR)

(73) Assignee: Boe-Hydis Technology Co., Ltd., Kyoungki-do (KR)

(*) Notice: Subject to any disclaimer, the term of this patent is extended or adjusted under 35 U.S.C. 154(b) by 35 days.

(21) Appl. No.: 10/004,626

(22) Filed: Dec. 4, 2001

(65) Prior Publication Data

US 2002/0067454 A1 Jun. 6, 2002

(30) Foreign Application Priority Data

Dec. 5, 2000 (KR) ........................... 2000-73310

(51) Int. Cl.⁷ .................... G02F 1/1337; G02F 1/1343
(52) U.S. Cl. ........................ 349/141; 349/123
(58) Field of Search ............... 349/141, 143, 349/123, 138, 165

(56) References Cited

U.S. PATENT DOCUMENTS

| | | | | |
|---|---|---|---|---|
| 5,825,445 A | * | 10/1998 | Okamoto et al. | 349/118 |
| 6,072,553 A | * | 6/2000 | Mitsui et al. | 349/113 |
| 6,100,956 A | * | 8/2000 | Oh-e et al. | 349/141 |
| 6,115,095 A | * | 9/2000 | Suzuki et al. | 349/141 |
| 6,160,604 A | * | 12/2000 | Murai et al. | 349/143 |
| 6,191,837 B1 | * | 2/2001 | Fujimaki et al. | 349/141 |
| 6,341,004 B1 | * | 1/2002 | Kondo et al. | 349/141 |
| 6,411,355 B1 | * | 6/2002 | Manabe et al. | 349/120 |
| 6,429,914 B1 | * | 8/2002 | Kubota et al. | 349/86 |
| 6,459,468 B2 | * | 10/2002 | Shibahara | 349/155 |
| 6,466,288 B1 | * | 10/2002 | Rho | 349/141 |
| 6,466,291 B1 | * | 10/2002 | Ham | 349/141 |
| 6,469,762 B1 | * | 10/2002 | Hong et al. | 349/123 |
| 6,476,900 B1 | * | 11/2002 | Lee et al. | 349/141 |
| 6,493,055 B1 | * | 12/2002 | Shimoshikiryo et al. | 349/141 |
| 6,504,591 B1 | * | 1/2003 | Kondo et al. | 349/123 |
| 6,504,594 B2 | * | 1/2003 | Ohe et al. | 349/141 |
| 6,507,382 B1 | * | 1/2003 | Sakamoto et al. | 349/141 |
| 6,512,565 B1 | * | 1/2003 | Lee et al. | 349/130 |

\* cited by examiner

*Primary Examiner*—John F. Niebling
*Assistant Examiner*—Walter L. Lindsay, Jr.
(74) *Attorney, Agent, or Firm*—Ladas & Parry

(57) ABSTRACT

A reflective type fringe field switching mode liquid crystal display device having improved contrast is provided. The device has a lower and an upper substrates arranged with a distance and having a unit pixel defined therein. Between the substrates, a liquid crystal layer having a plurality of liquid crystal molecules are interposed. A counter electrode is formed on an inner surface of the lower substrate in the unit pixel. A pixel electrode is formed above the counter electrode. The pixel electrode and the counter electrode generate a fringe field for driving the liquid crystal molecules in the unit pixel. A horizontal alignment layer having a rubbing axis is interposed between the lower substrate and the liquid crystal layer, and a vertical alignment layer is interposed between the upper substrate and the liquid crystal layer. In addition, a polarizer is disposed on an outer surface of the upper substrate and having a polarizing axis.

14 Claims, 5 Drawing Sheets

LIQUID CRYSTAL DISPLAY DEVICE OF REFLECTIVE TYPE FRINGE FIELD SWITCHING MODE

BACKGROUND OF THE INVENTION

1. Field of the Invention

The present invention relates to a reflective type liquid crystal display device, and more particularly, to a reflective type hybrid alignment fringe field switching mode LCD (hereinafter, referred to as FFS-LCD).

2. Description of the Prior Art

A conventional reflective type LCD has generally employed a twisted nematic (TN) mode LCD in which liquid crystal composition having positive dielectric anisotropy is twist-aligned. The reflective type TN-LCD has an advantage of low power consumption and is used in small-sized LCD such as electronic table clocks and digital clocks. However, the reflective type TN-LCD has disadvantages of poor viewing angle properties and low contrast ratio.

In order to realize better viewing angle properties, higher reflectance, and higher aperture ratio, recent efforts are focused on research and development of a reflective type FFS-LCD. FIGS. 1 and 2 show outlines of the conventional FFS-LCD.

Referring to FIGS. 1 and 2, a lower substrate 11 and an upper substrate 12 are opposed with a predetermined distance. A liquid crystal layer 15 having a plurality of liquid crystal molecules 15a are interposed between the lower substrate 11 and the upper substrate 12. A counter electrode 14 and a pixel electrode 13 are arranged on the inner sides of the lower substrate 11, serving to form a fringe field for driving the liquid crystal molecules 15a. A color filter (not shown) is arranged on the inner side of the upper substrate 12. A first horizontal alignment layer 20 is interposed between the lower substrate 11 and the liquid crystal layer 15. And, a second horizontal alignment layer 19 is also interposed between the upper substrate 12 and the liquid crystal layer 15.

The first and the second horizontal alignment layers 20 and 19 have rubbing axes, respectively. The rubbing axis of the first horizontal alignment layer 20 forms an angle of 180° (anti-parallel) with that of the second horizontal alignment layer 19. Also, the rubbing axis of the first horizontal alignment layer 20 forms a predetermined angle with a line obtained on the surface of the substrate by projecting a fringe filed formed between the counter electrode 14 and the pixel electrode 13. A polarizer 18 is attached on the outer side of the upper substrate 12, the polarizing axis thereof being consistent with the rubbing axis of the first horizontal alignment layer 20. A quarter wavelength plate 17 is arranged on the outer side of the lower substrate 11 so as to polarize the incident or reflective light. And, a reflector 16 is arranged on the outer side of the quarter wavelength plate 17 so as to reflect the light passed through the quarter wavelength plate 17. A fast or slow axis of the quarter wavelength plate 17 forms an angle of 45° with the rubbing axis of the first horizontal alignment layer 20.

The operation of the conventional reflective type FFS-LCD will be explained in the following.

Referring to FIG. 1, when no voltage difference is generated between the counter electrode 14 and the pixel electrode 13, the liquid crystal molecules 15a are arranged, the major axes thereof being parallel with the rubbing axes of the horizontal alignment layers 20 and 19. Therefore, natural light becomes incident light moving toward the direction of the polarizing axis after passing through the polarizer 18. Afterwards, the incident light passes through the liquid crystal layer 15 wherein major axes of the liquid crystal molecules 15a are arranged to be parallel with rubbing axes of the horizontal alignment layers 20 and 19, and therefore, the moving direction of the incident light is not changed. Since the incident light forms an angle of 45° with the fast or slow axis of the quarter wavelength plate 17, the incident light is changed into right or left circular polarized light through the quarter wavelength plate 17 after passing through the liquid crystal layer 15. The right circular polarized light is then reflected by the reflector 16 and changes left circularly polarized A reflective light passes through the quarter wavelength plate 17 having the fast or slow axis forming an angle of 45° with the moving direction thereof. Therefore, the moving direction of the reflective light is shifted to a direction perpendicular to the polarizing axis. Since the shifted direction of the reflective light is perpendicular to the major axes of the liquid crystal molecules 15a, the reflective light passes through the liquid crystal layer 15 without a change of the moving direction. Then, the reflective light is at right angles with the polarizing axis after passing through the liquid crystal layer 15, thereby not passing through the polarizer 18. As a result, a screen shows a dark state.

Referring to FIG. 2, when a fringe field (E) is formed between the counter electrode 14 and the pixel electrode 13, the liquid crystal molecules 15a are twisted in a shape of the fringe field. Therefore, optical axes of the liquid crystal molecules 15a form a predetermined angle with the polarizing axis. Passing through the polarizer 18, natural light becomes incident light moving toward the direction of the polarizing axis. Then, the incident light forms an angle of 45° with the major axes of the liquid crystal molecules 15a arranged along the fringe field. Therefore, the incident light forms an angle of 45° with the polarizing axis after passing through the liquid crystal layer 15. Since the incident light corresponds with the fast or slow axis of the quarter wavelength plate 17 after passing through the liquid crystal layer 15, the moving direction of the incident light is not changed when passing through the quarter wavelength plate 17. After passing through the quarter wavelength plate 17, the incident light is reflected by the reflector 16.

A reflective light passes through the quarter wavelength plate 17 without a change of the moving direction since the moving direction corresponds with the fast or slow axis of the quarter wavelength plate 17. The moving direction of the reflective light passing through the quarter wavelength plate 17 forms an angle of 45° with the major axis of the liquid crystal molecules 15a of the liquid crystal layer 15, so that the moving direction of reflective light through the liquid crystal layer 15 corresponds with the polarizing axis. As a result, the screen shows a white state.

The conventional reflective type FFS-LCD has, however, several problems.

The conventional reflective type FFS-LCD additionally uses optical members such as the quarter wavelength plate on the outer side of the substrate in order to improve contrast without employing back light as a light source. This may cause an increase of manufacturing cost. Moreover, the transmittance and the reflectance of the LCD are lowered since the quarter wavelength plate does not generally convert the linear polarized incident lights into circular polarized light across all the wavelength or visa versa.

In order to solve the above-mentioned problems, especially in cost point of view, other method has been proposed that the liquid crystal layer substitutes for the quarter wavelength plate by making $\lambda(2n+1)/4$ of the phase retardation ($d\Delta n$) of the liquid crystal layer.

However, this method as well has several drawbacks, which will be explained in the following.

Although the phase retardation of the liquid crystal layer is controlled to $\lambda(2n+1)/4$, this phase retardation may serve to realize a dark state in only a specific range of wavelengths considering that the phase retardation is a function of light wavelength ($\lambda$). Therefore, complete contrast is not obtained in whole ranges of wavelengths.

Furthermore, in order to determine the initial arrangement direction of the liquid crystal molecules, it is required to perform a rubbing process for forming rubbing axes on alignment layers of the upper and lower substrates. As well known in the art, the rubbing process may cause faults in process and surface damage of the alignment layer. Due to such problems, liquid crystal molecules may be misaligned in the dark state, and further, light may leak out. Unfortunately, this may result in poor screen characteristics of the FFS-LCD.

SUMMARY OF THE INVENTION

It is therefore an object of the present invention to provide a reflective type FFS-LCD device with improved contrast.

In order to achieve the above and other objects, the present invention provides a liquid crystal display device of a reflective type fringe field switching mode, comprising: a lower and an upper substrates arranged with a distance and having a unit pixel defined therein; a liquid crystal layer having a plurality of liquid crystal molecules and interposed between the lower and the upper substrates; a counter electrode formed on an inner surface of the lower substrate in the unit pixel; a pixel electrode formed above the counter electrode, wherein the pixel electrode and the counter electrode generate a fringe field for driving the liquid crystal molecules in the unit pixel; a horizontal alignment layer interposed between the lower substrate and the liquid crystal layer and having a rubbing axis; a vertical alignment layer interposed between the upper substrate and the liquid crystal layer; and a polarizer disposed on an outer surface of the upper substrate and having a polarizing axis.

The polarizing axis of the polarizer may correspond with or forms an angle of 45° with the rubbing axis of the horizontal alignment layer. When the polarizing axis corresponds with the rubbing axis, the rubbing axis may form an angle of 45 to 90° with a projected line of the fringe field on the substrates if the liquid crystal molecules have positive dielectric anisotropy. Also, the rubbing axis may form an angle of 0 to 45° with the projected line if the liquid crystal molecules have negative dielectric anisotropy. Furthermore, in applying the fringe field, an effective phase retardation of the liquid crystal layer $d\Delta n$, where d is a distance between the lower and the upper substrates and $\Delta n$ is a refractive anisotropy of the liquid crystal molecules, is $\lambda(2n+1)/4$, where n is an integer.

Alternatively, when the polarizing axis of the polarizer forms an angle of 45° with the rubbing axis, the rubbing axis may form an angle of 45 to 90° with a projected line of the fringe field on the substrates if the liquid crystal molecules have positive dielectric anisotropy. And, if the liquid crystal molecules have negative dielectric anisotropy, the rubbing axis may form an angle of 0 to 45° with with the projected line. Furthermore, before applying the fringe field, an effective phase retardation of the liquid crystal layer $d\Delta n$, where d is a distance between the lower and the upper substrates and $\Delta n$ is a refractive anisotropy of the liquid crystal molecules, is $\lambda(2n+1)/4$, where n is an integer.

Preferably, a refractive anisotropy $\Delta n$ of the liquid crystal molecules may be at the range of 0.04 to 0.2, and a distance between the lower and the upper substrates may be 2 to 10 µm. In addition, the liquid crystal layer may include dopants for serving to make the liquid crystal molecules easily twisted in applying field. Also, the liquid crystal display device may further comprise a reflector disposed near the lower substrate so as to reflect an incident light from the upper substrate. The counter-electrode is preferably made of one selected from a group consisting of aluminum, gold and silver.

DETAILED DESCRIPTION OF THE INVENTION

The present invention will be now described more fully hereinafter with reference to accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
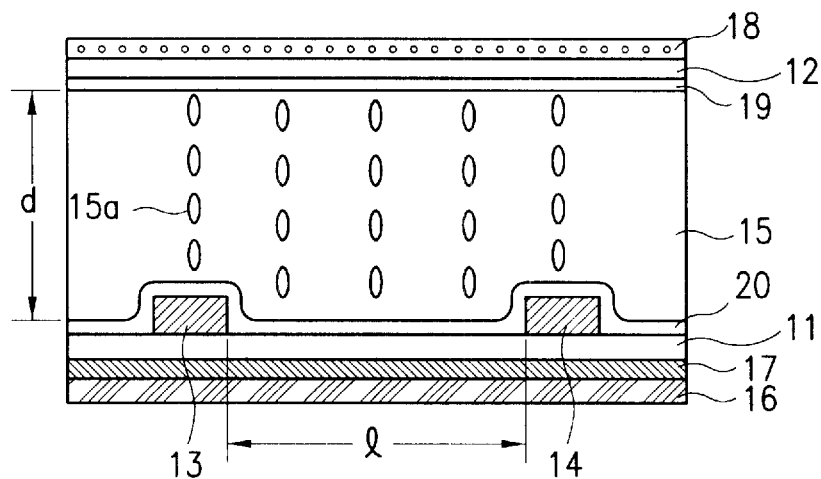
FIG. 1 is a cross sectional view for showing a state before applying voltage according to a conventional reflective type FFS-LCD.
Figure 2:
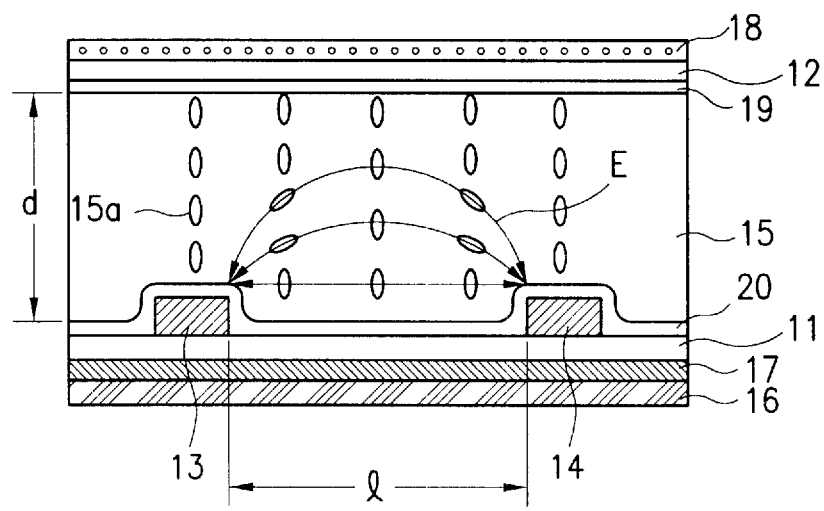
FIG. 2 is a cross sectional view for showing a state after applying voltage according to a conventional reflective type FFS-LCD.
Figure 3A:
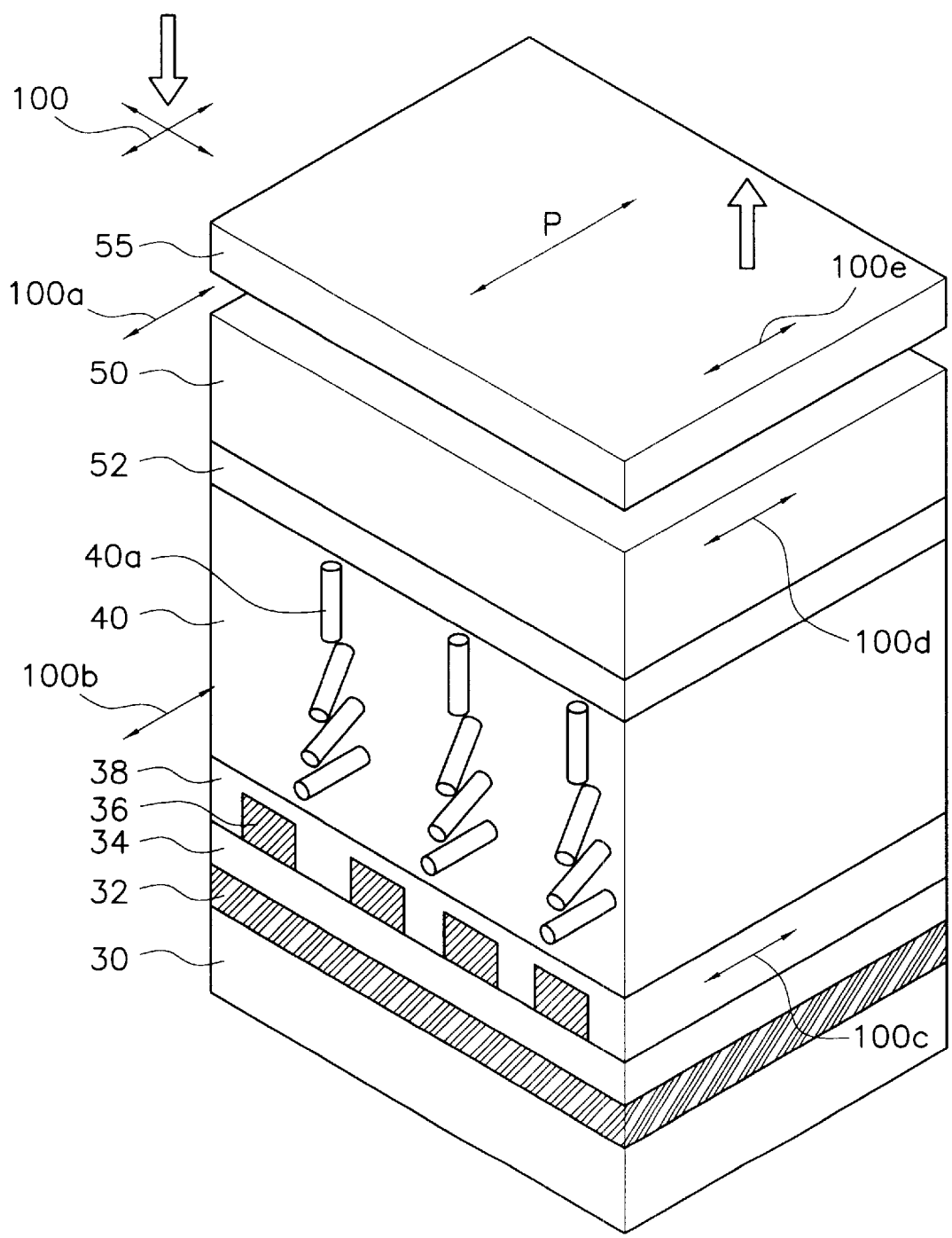
FIGS. 3A and 3B are perspective views for showing states of before and after applying voltage in an FFS-LCD according to a first embodiment of the present invention.
Figure 3B:
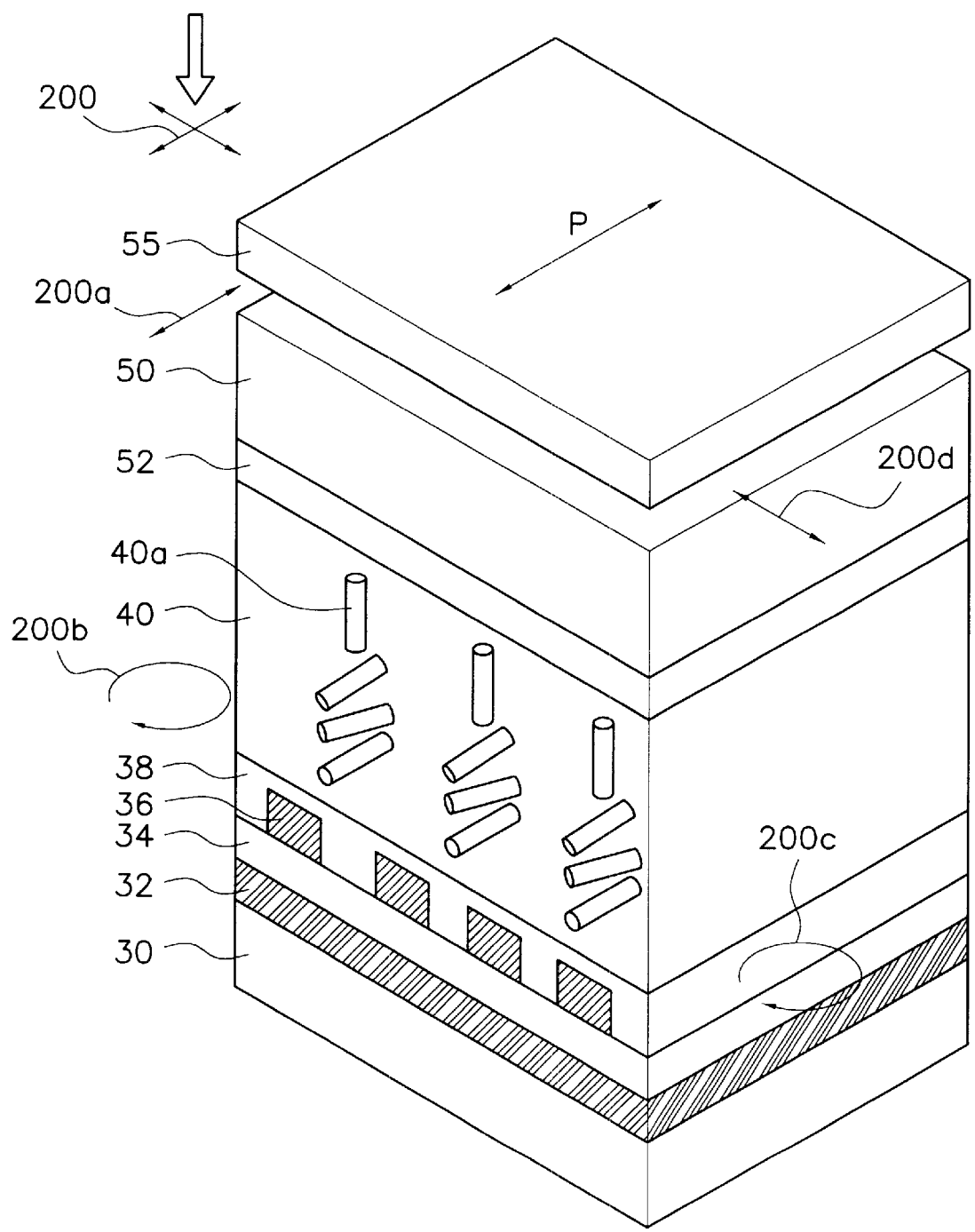
Figure 4A:
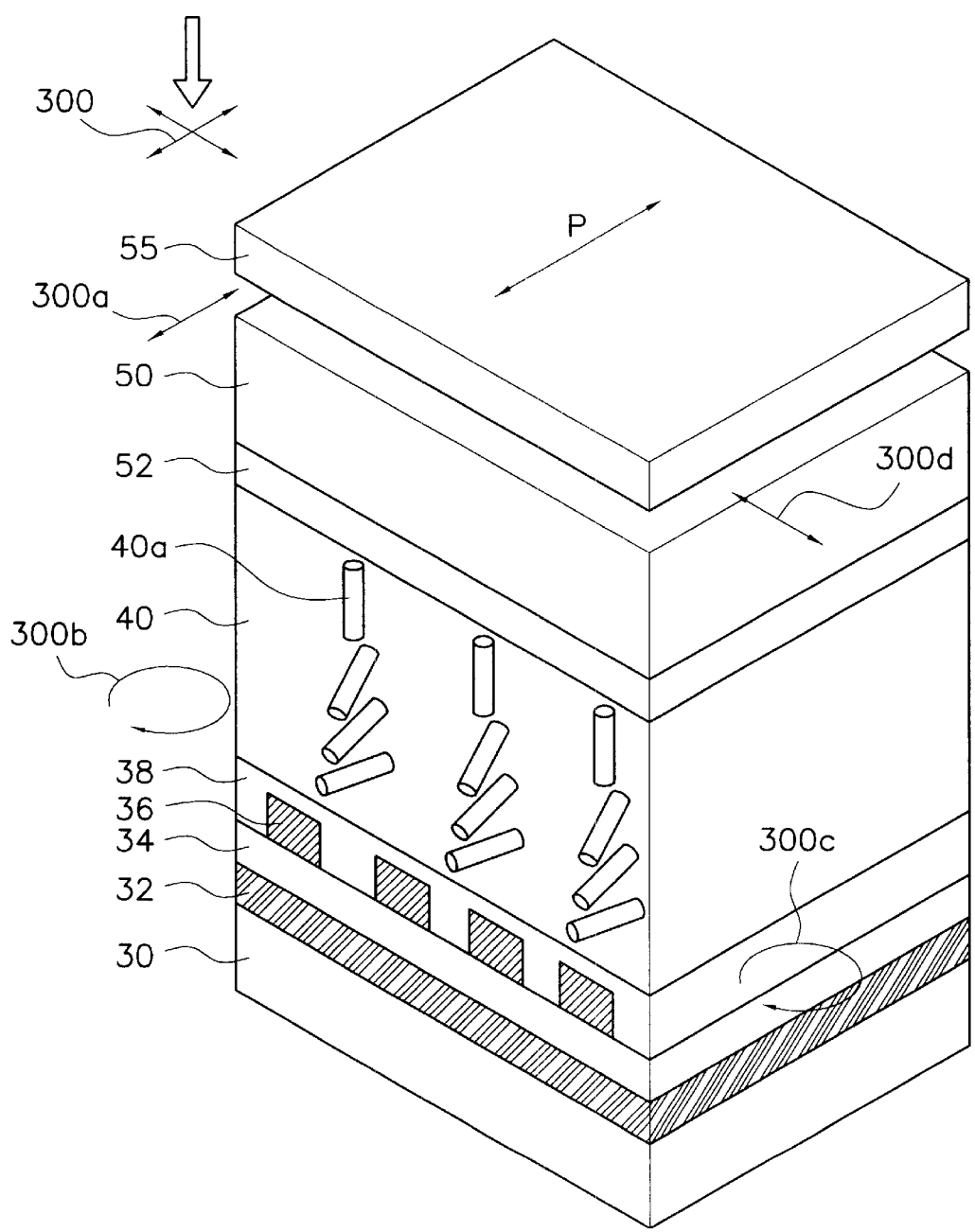
FIGS. 4A and 4B are perspective views for showing states of before and after applying voltage in an FFS-LCD according to a second embodiment of the present invention.
Figure 4B:
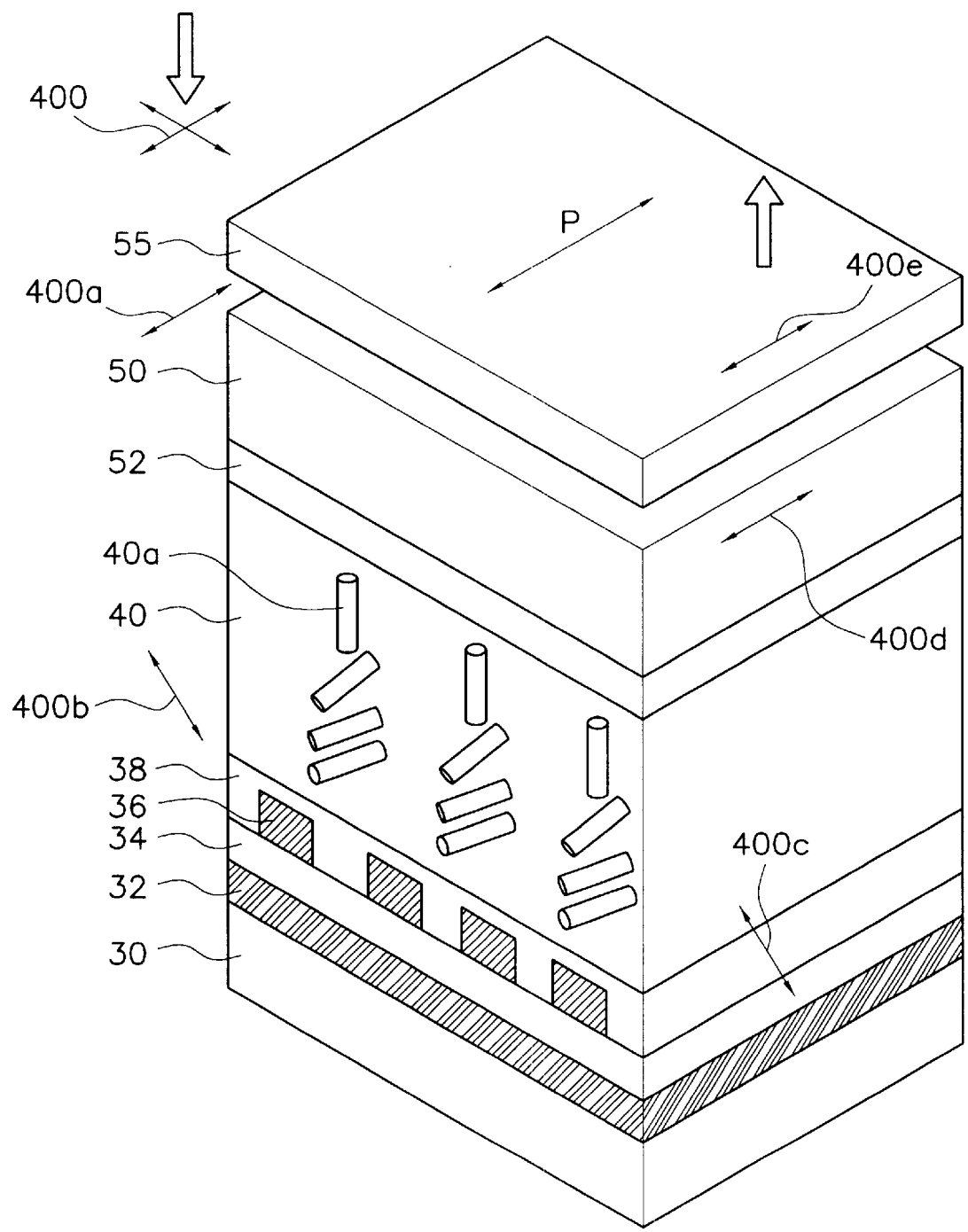

FIGS. 3A and 3B are perspective views of FFS-LCD according to a first embodiment of the present invention and FIGS. 4A and 4B are that according to a second embodiment of the present invention, wherein FIGS. 3A and 4A shows operation states before applying voltage and FIGS. 3B and 4B that after applying voltage.

First Embodiment: Normally White Mode
Reflective Type Hybrid Alignment Nematic (HAN)
FFS-LCD Referring to FIGS. 3A and 3B, a lower substrate 30 and an upper substrate 50 are opposed with a predetermined distance. A liquid crystal layer 40 comprising a plurality of liquid crystal molecules 40a is interposed between the lower substrate 30 and the upper substrate 50. The liquid crystal molecules 40a have positive or negative dielectric anisotropy and dopants are added to be easily twisted in applying voltage. It is desirable that d/p (d: distance between upper and lower substrates, p: pitch) is less than 0.5.

A counter electrode 32 is arranged on the inner side of the lower substrate 30 in a shape of plate or comb. According to the present embodiment, it is formed in a shape of plate. And, the counter electrode 32 is made of materials having improved reflective efficiency, such as aluminum Al, gold Au and silver Ag, to serve as a reflector of the reflective type liquid crystal display device. A gate insulating layer 34 is formed on the surface of the counter electrode 32 and on the upper part of the gate insulating layer 34, a pixel electrode 36 is formed in a shape of comb, to form a fringe field with the counter electrode 32. The pixel electrode 36 is made of the same material as the counter electrode 32. Alternatively, the pixel electrode 36 is made of transparent conductor. The fringe field is formed between counter electrodes 32 exposed by a comb region and another comb region of the pixel electrode 36.

Then, a horizontal alignment layer 38 is formed on the surface of the resulting lower substrate 30. The horizontal alignment layer 38 has a rubbing axis to a predetermined direction by performing rubbing processes. The direction of rubbing axis depends on the dielectric anisotropy of the liquid crystal molecules 40a. That is, in order to realize maximum transmittance, when the liquid crystal molecules 40a have negative dielectric anisotropy, the rubbing axis forms an angle of 0 to 45° with the substrate projection plane of the fringe field and when positive dielectric anisotropy, the rubbing axis forms an angle of 45 to 90° with the substrate projection plane of the fringe field.

A vertical alignment layer 52 is arranged on the opposing inner side of the upper substrate 50. As is known, additional rubbing processes are not performed on the vertical alignment layer 52. As described above, a vertical alignment layer is arranged on one substrate of upper and lower substrates and a horizontal alignment layer on the other substrate.

The structure is referred to as Hybrid-Aligned Nematic HAN mode.

A polarizer 55 having a predetermined polarizing axis P is arranged on the outer side of the upper substrate 50. The switching mode of reflective type liquid crystal display device is determined according to the direction of the polarizing axis P. In the present embodiment, the polarizing axis P corresponds with the rubbing axis.

And, when voltage is applied in a normally white mode, the effective phase retardation of liquid crystal layer 40 d$\Delta$n (d: distance between upper and lower substrates, $\Delta$n: refractive anisotropy of liquid crystal molecules) is controlled to $\lambda(2n+1)/4$, (n is an integer), to serve as a quarterly wavelength plate. The phase retardation of reflective type is required to be smaller that that of transmittance type, for the smooth operation of liquid crystal molecules 40a. However, it is difficult to control the cell gap and the refractive anisotropy since the field formation and transmittance are influenced by the reduction of cell gap and refractive anisotropy in FFS-LCD.

However, according to the present embodiment, the vertical alignment layer 52 is formed on the upper substrate 50. Therefore, the liquid crystal molecules 40a are arranged on the upper substrate 50, the major axis thereof being perpendicular to the substrate, thereby relatively reducing effective phase retardation. As a result, the effective phase retardation is reduced to operate in a reflective type without additional controls. It is desirable that the refractive anisotropy $\Delta$n is at the range of 0.04 to 0.2 and the distance between upper and lower substrates 30, 50 is at the range of 2 to 10 $\mu$m.

The following shows the operation of the reflective type FFS-LCD according to the present invention.

Referring to FIG. 3A, when a voltage difference is not generated between the counter electrode 32 and the pixel electrode 36, liquid crystal molecules 40a are arranged on the lower substrate 30, the major axis being parallel to the surface of substrate and as closer to the upper substrate 50, the major axis becomes perpendicular to the surface of substrate, thereby forming a hybrid structure. The major axis of the liquid crystal molecules 40a on the lower substrate 30 is arranged to be parallel to the rubbing axis corresponding with the polarizing axis P. Therefore, natural light 100 becomes incident light 10a moving toward the direction corresponding with the polarizing axis P through the polarizer 55. Afterwards, the incident light 100a passes through the liquid crystal layer 40, wherein liquid crystal molecules 40a are arranged in a hybrid structure, without change of moving direction. After passing through the liquid crystal layer 40, the incident light 100b becomes reflective light 100c by the counter electrode 32.

The reflective light 100c repasses through the liquid crystal layer 40 without change of the moving direction since it is at right angles to the major axis of liquid crystal molecules 40a on the lower substrate 30. After passing through the liquid crystal layer 40, the reflective light 100d passes through the polarizer 55 since it corresponds with the polarizing axis P. Therefore, the screen becomes white.

Referring to FIG. 3B, when a fringe field E is formed between the counter electrode 32 and the pixel electrode 36, liquid crystal molecules 40a are twisted in a shape of the fringe field E. The lower substrate 30 projection line of the fringe field E forms a predetermined angle with the polarizing axis P. Therefore, liquid crystal molecules 40a are arranged, the major axis or light axis being parallel to the fringe field, thereby generating phase retardation by (2n+1) $\lambda$/4 (n is an integer) in the liquid crystal layer 40.

The natural light 200 passes through the polarizer 55, thereby becoming incident light 200a corresponding with the polarizing axis P. After passing through the polarizer 55, the moving direction of incident light 200a is changed by passing through the liquid crystal layer 40 having phase retardation of (2n+1) $\lambda$/4 (n is an integer). Therefore, it becomes right circularly polarized incident light 200b. And, the right circularly polarized incident light 200b is reflected by the counter electrode 32, thereby becoming right circularly polarized reflective light 200c.

Then, the reflective light 200c becomes reflective light 200d being at right angles to the polarizing axis P by phase retardation of the liquid crystal layer 40. After passing through the liquid crystal layer 40, the reflective light 200d can not pass through the polarizer 55 since the moving direction thereof becomes at right angles to the polarizing axis P. Therefore, the screen becomes dark and as a result, normally white mode display is realized without preparing quarterly wavelength plate. Here, most liquid crystal molecules 40a are twisted in unit pixels, thereby realizing high transmittance and high aperture ratio.

And, the liquid crystal molecules 40a are driven in a rapid response time since they are vertically aligned on the upper substrate 50. And, it is not required to perform additional rubbing processes on the vertical alignment layer 52 of the upper substrate 50, thereby removing alignment deterioration of the upper substrate 50. Moreover, it is possible to employ the resulting lower substrate of conventional FFS-LCD without additional change since the resulting lower substrate 30 is the same as that of conventional FFS-LCD.

Second Embodiment: Normally Black Mode Reflective Type HAN FFS-LCD

FIGS. 4A and 4B are cross sectional views of reflective type HAN FFS-LCD according to a second embodiment of the present invention, wherein the structures of the lower substrate 30 and the upper substrate 50 are the same as that of the first embodiment and the liquid crystal layer 40 and the polarizer 55 are differently arranged. As shown in FIG. 4A, according to the reflective type HAN FFS-LCD of the present embodiment, the polarizing axis P of the polarizer 55 forms a predetermined angle, desirably, an angle of 45° with the rubbing axis R in order to operate in a normally black mode. And, before voltage is applied, the effective phase retardation of liquid crystal layer 40 dΔn (d: distance between upper and lower substrates, Δn: refractive anisotropy of liquid crystal molecules) is controlled to λ(2n+1)/4, (n is an integer), to serve as a quarterly wavelength plate.

The following shows the operation of normally black mode reflective type FFS-LCD.

Before a fringe field is formed, liquid crystal molecules 40a are arranged, the major axis corresponding with the rubbing axis and parallel to the substrate. Then, natural light 300 becomes incident light 300a by the polarizer 55, moving toward the direction corresponding with the polarizing axis P, as shown in FIG. 4A. When the incident light 300a passes through the liquid crystal layer 40, phase retardation is generated by λ(2n+1)/4, thereby becoming right circularly polarized incident light 300b. After passing through the liquid crystal layer 40, the incident light 300b is reflected by the counter electrode 32, thereby becoming reflective light 300c.

The reflective light becomes reflective light 300d being perpendicular to the polarizing axis P by passing through the liquid crystal layer 40 since the moving direction of the reflective light 300c forms an angle of 45° with the major axis of liquid crystal molecules 40a. After passing through the liquid crystal layer 40, the reflective light 300c can not pass through the polarizer 55 since the moving direction thereof becomes at right angles to the polarizing axis P. Therefore, the screen becomes dark.

When the fringe field F is generated, liquid crystal molecules 40a are arranged, the major axis or the minor axis thereof being parallel to the fringe field E. As shown in FIG. 4B, natural light 400 becomes incident light 400a corresponding with the polarizing axis P by passing through the polarizer 55. The incident light 400a becomes incident light 400b moving toward the direction at right angles to the polarizing axis P by passing through the liquid crystal layer 40, since liquid crystal molecules are twisted by 45° without phase retardation. After passing through the liquid crystal layer 40, the incident light 400b is reflected by the counter electrode 32, thereby becoming reflective light 400c.

The reflective light 400c passes through the liquid crystal layer 40 arranged in a shape of fringe field, thereby becoming reflective light 400d corresponding with the polarizing axis. After passing through the liquid crystal layer 40, the reflective light 400d passes through the polarizer 55 since moving direction thereof corresponds with the polarizing axis P. Therefore, the screen becomes white. That is, it is possible to realize display in a normally black mode without preparing the quarterly wavelength plate.

However, the present invention is not limited to the above-described embodiments. For example, according to the present invention, the counter electrode is employed as reflector. However, it is also possible to form the counter electrode and the pixel electrode with transparent conductors and then, to prepare additional reflector.

As described above, according to the present invention, the horizontal alignment layer is arranged on the lower substrate and the vertical alignment layer on the upper substrate.

Therefore, liquid crystal molecules are arranged in a shape of hybrid before the field is applied, thereby compensating for refractive anisotropy of liquid crystal molecules by the arrangement. As a result, it is possible to realize complete dark in diverse light wave bands.

And, effective phase retardation is reduced to operate in a reflective type without control of the distance between upper and lower substrates and refractive anisotropy.

And, alignment deterioration is remarkably reduced by arranging the vertical alignment layer on the upper substrate. Therefore, misalignment of liquid crystal molecules are prevented in dark, thereby improving screen quality and contrast ratio.

And, liquid crystal molecules of the upper substrate are vertically aligned by the vertical alignment layer, thereby remarkably reducing the response time.

Moreover, the liquid crystal layer has phase retardation enough to serve as quarterly wavelength plate. Therefore, it is not required to prepare additional optical means such as quarterly wavelength plate, thereby improving reflectance.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquid crystal display device of a reflective type fringe field switching mode, comprising:

a lower and an upper substrates arranged with a distance and having a unit pixel defined therein;

a liquid crystal layer having a plurality of liquid crystal molecules and interposed between the lower and the upper substrates;

a counter electrode formed on an inner surface of the lower substrate in the unit pixel;

a pixel electrode formed above the counter electrode, wherein the pixel electrode and the counter electrode generate a fringe field for driving the liquid crystal molecules in the unit pixel;

a horizontal alignment layer interposed between the lower substrate and the liquid crystal layer and having a rubbing axis;

a vertical alignment layer interposed between the upper substrate and the liquid crystal layer; and a polarizer disposed on an outer surface of the upper substrate and having a polarizing axis.

2. The liquid crystal display device according to claim 1, wherein the polarizing axis of the polarizer corresponds with the rubbing axis of the horizontal alignment layer.

3. The liquid crystal display device according to claim 2, wherein the rubbing axis forms an angle of 45 to 90° with a projected line of the fringe field on the substrates when the liquid crystal molecules have positive dielectric anisotropy, and the rubbing axis forms an angle of 0 to 45° with a projected line of the fringe field on the substrates when the liquid crystal molecules have negative dielectric anisotropy.

4. The liquid crystal display device according to claim 3, wherein, in applying the fringe field, an effective phase retardation of the liquid crystal layer dΔn, where d is a distance between the lower and the upper substrates and Δn is a refractive anisotropy of the liquid crystal molecules, is λ(2n+1)/4, where n is an integer.

5. The liquid crystal display device according to claim 1, wherein the polarizing axis of the polarizer forms an angle of 45° with the rubbing axis of the horizontal alignment layer.

6. The liquid crystal display device according to claim 5, the rubbing axis forms an angle of 45 to 90° with a projected line of the fringe field on the substrates when the liquid crystal molecules have positive dielectric anisotropy, and the rubbing axis forms an angle of 0 to 45° with a projected line of the fringe field on the substrates when the liquid crystal molecules have negative dielectric anisotropy.

7. The liquid crystal display device according to claim 6, wherein, before applying the fringe field, an effective phase retardation of the liquid crystal layer d$\Delta$n, where d is a distance between the lower and the upper substrates and $\Delta$n is a refractive anisotropy of the liquid crystal molecules, is $\lambda(2n+1)/4$, where n is an integer.

8. The liquid crystal display device according to claim 1, wherein a refractive anisotropy $\Delta$n of the liquid crystal molecules is at the range of 0.04 to 0.2.

9. The liquid crystal display device according to claim 2, wherein a refractive anisotropy $\Delta$n of the liquid crystal molecules is at the range of 0.04 to 0.2.

10. The liquid crystal display device according to claim 5, wherein a refractive anisotropy $\Delta$n of the liquid crystal molecules is at the range of 0.04 to 0.2.

11. The liquid crystal display device according to claim 1, wherein a distance between the lower and the upper substrates is 2 to 10 $\mu$m.

12. The liquid crystal display device according to claim 1, wherein the liquid crystal layer includes dopants for serving to make the liquid crystal molecules easily twisted in applying field.

13. The liquid crystal display device according to claim 1, further comprising:
    a reflector disposed near the lower substrate so as to reflect an incident light from the upper substrate.

14. The liquid crystal display device according to claim 1, wherein the counter electrode is made of one selected from a group consisting of aluminum, gold and silver.

* * * * *